United States Patent
Chiang et al.

(10) Patent No.: US 10,947,120 B2
(45) Date of Patent: Mar. 16, 2021

(54) PRODUCTION METHOD OF LOW DIMENSIONAL NANO-MATERIAL

(71) Applicant: National Taiwan University of Science and Technology, Taipei (TW)

(72) Inventors: Wei-Hung Chiang, Taipei (TW); Hao-Hsuan Chien, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 259 days.

(21) Appl. No.: 16/221,677

(22) Filed: Dec. 17, 2018

(65) Prior Publication Data

US 2020/0062599 A1 Feb. 27, 2020

(30) Foreign Application Priority Data

Aug. 21, 2018 (TW) ................. 107129172

(51) Int. Cl.
| | | |
|---|---|---|
| *C01B 32/184* | (2017.01) | |
| *C09K 11/68* | (2006.01) | |
| *C01B 32/194* | (2017.01) | |
| *C09K 11/08* | (2006.01) | |
| *C09K 11/65* | (2006.01) | |
| *B82Y 20/00* | (2011.01) | |
| *B82Y 40/00* | (2011.01) | |
| *B82Y 30/00* | (2011.01) | |

(52) U.S. Cl.
CPC .......... *C01B 32/184* (2017.08); *C01B 32/194* (2017.08); *C09K 11/0805* (2013.01); *C09K 11/65* (2013.01); *C09K 11/681* (2013.01); *B82Y 20/00* (2013.01); *B82Y 30/00* (2013.01); *B82Y 40/00* (2013.01); *C01P 2004/04* (2013.01); *C01P 2006/40* (2013.01)

(58) Field of Classification Search
CPC ... C01B 32/184; C01B 32/194; C01B 32/205; B82Y 20/00; B82Y 40/00; B82Y 30/00; C01P 2006/40; C01P 2004/04
See application file for complete search history.

(56) References Cited

U.S. PATENT DOCUMENTS

2018/0212247 A1* 7/2018 Zhamu ................ H01M 4/0419

FOREIGN PATENT DOCUMENTS

CN 106830084 A * 6/2017

OTHER PUBLICATIONS

Park, Jongha, et al. "Exfoliated HNb3O8 nanosheets of enhanced acidity prepared by efficient contact of K2CO3 with Nb2O5." Advanced Powder Technology 28.10 (2017): 2524-2531.*

(Continued)

*Primary Examiner* — Richard M Rump
(74) *Attorney, Agent, or Firm* — Alan D. Kamrath; Karin L. Williams; Mayer & Williams PC

(57) ABSTRACT

A production method of low dimensional nano-material comprises steps of: introducing a layered material; adding an intercalating agent into the layered material; and exfoliating the layered material by ball-milling to form the low dimensional material. Mechanochemical approaches for low dimensional nano-material like graphene quantum dots synthesis offer a promise of new reaction pathways, and greener and more efficient syntheses, making them potential approaches for low cost production.

8 Claims, 3 Drawing Sheets

(56) References Cited

OTHER PUBLICATIONS

Kim, Jungryang, et al. "Structures of boron nitride intercalation compound with lithium synthesized by mechanical milling and heat treatment." Journal of Alloys and Compounds 685 (2016): 135-141.*

Wang, Lve, et al. "Carbon quantum dots displaying dual-wavelength photoluminescence and electrochemiluminescence prepared by high-energy ball milling." Carbon 94 (2015): 472-478.*

Xing, Tan, et al. "Gas protection of two-dimensional nanomaterials from high-energy impacts." Scientific reports 6.1 (2016): 1-9.*

Krishnamoorthy, Karthikeyan, et al. "Mechanically delaminated few layered MoS2 nanosheets based high performance wire type solid-state symmetric supercapacitors." Journal of Power Sources 321 (2016): 112-119.*

Zhang, Shan, Xiaofang Jia, and Erkang Wang. "Facile synthesis of optical pH-sensitive molybdenum disulfide quantum dots." Nanoscale 8.33 (2016): 15152-15157.*

\* cited by examiner

PRODUCTION METHOD OF LOW DIMENSIONAL NANO-MATERIAL

FIELD OF INVENTION

The present invention is related to a production method of a nano-material, and more particularly, to the production method of a low dimensional nano-material.

BACKGROUND OF THE INVENTION

Graphene quantum dots (GQDs) are zero-dimensional (0D) material having a diameter of less than 100 nm. GQDs have become more popular and have drawn more attention recently due to its small nano-size, quantum confinement and edge effects which lead to excellent properties including tunable photoluminescence (PL) property, good water solubility and biocompatibility. Hence, GQDs have been widely applied in fields of biomedical, solar cells, electronic components, fluorescence imaging, drug delivery and photodynamic therapy. Moreover, GQDs are also suitable for biomedical detectors by based upon its fluorescence ability.

Most commonly used synthesis methods for GQDs include laser cutting, chemical reduction-oxidation, microwave synthesis and hydrothermal process. By using these synthesis methods, uncontrollable size and influence of fluorescence ability of GQDs are some problems that arise. A large amount of organic solvents are usually involved in the aforementioned synthesis methods which may cause environmental pollution or cause damage to a worker's health. The production rate of GQDs may also be affected because of the existence of the organic solvent.

Other synthesis methods such as chemical synthesis or a fullerene cutting method can provide more controllable GQDs size and surface structures. However, the production rate is still difficult to increase using these methods. Hence, it is urgent to have a production method for synthesizing great quality GQDs with controllable size and a high production rate.

SUMMARY OF THE INVENTION

In order to solve the shortcomings of the conventional synthesis methods for graphene quantum dots (GQDs), such as uncontrollable size and low production rate, the present invention provides a method of producing low dimensional nano-material including the steps of: introducing a layered material; adding an intercalating agent into the layered material; and exfoliating the layered material by ball-milling to form the low dimensional material.

The layered material contains graphite, graphene or molybdenum disulfide. The intercalating agent comprises potassium carbonate, lithium carbonate, potassium hydroxide, potassium phosphate, sodium carbonate, sodium hydroxide, lithium hydrate, sodium bicarbonate, potassium nitrate, potassium bicarbonate or potassium sulphate.

More preferably, a rotational speed of ball-milling in aforementioned steps is at a range of 500 rpm to 1250 rpm. Energy of ball-milling is at a range of 15 GJ to 585.94 GJ, and a process time of ball-milling is at a range of 2 hours to 5 hours. A yield of the low dimensional nano-material is at a range of 0.88% to 100% and a quantum luminous efficiency of the low dimensional nano-material is at a range of 1.06% to 7.4%.

According to above description, the present invention has advantages as follows.

1. The present invention provides a facile, energy-efficient, scalable, and green (no acid and base, organic-solvent free) route to simultaneously prepare low dimensional nano-materials by high-energy ball milling the layered material and the intercalation agent. Simply by certain rotational speed and process time of mechanical ball milling process, the low dimensional nano-materials with united size, different luminous properties and high yield were successfully produced.

2. The present invention provides a simple, low cost and high efficiency production method to obtain high quality low dimensional nano-material. The production rate of the low dimensional material has been increased without any strong acid, strong oxidant or organic solvent to be required in the production method. The low dimensional nano-material of the present invention is able to be applied in the fields of detectors, electronic components or energy development. More particularly, based upon the fluorescence ability of low dimensional nano-material, the present invention is also suitable for many biomedical applications.

Many of the attendant features and advantages of the present invention will become better understood with reference to the following detailed description considered in connection with the accompanying drawings.

BRIEF DESCRIPTION OF THE DRAWINGS

The steps and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
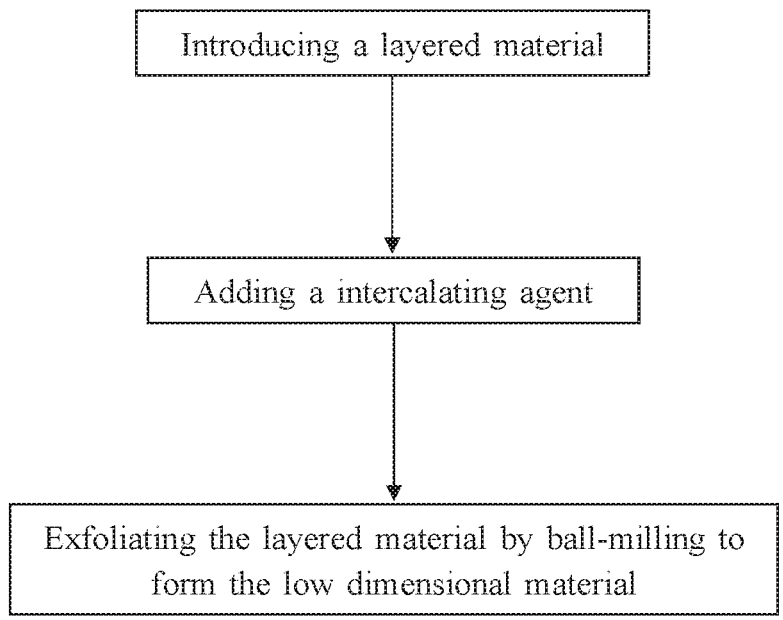
FIG. 1 is a flow chart of production method of a low dimensional nano-material in accordance with the present invention.

Reference will now be made in detail to the present preferred embodiments of the invention, examples of which are illustrated in the accompanying drawings. Wherever possible, the same reference numbers are used in the drawings and the description to refer to the same or like parts. It is not intended to limit the method by the exemplary embodiments described herein. In the following detailed description, for purposes of explanation, numerous specific details are set forth in order to attain a thorough understanding of the disclosed embodiments. It will be apparent, however, that one or more embodiments may be practiced without these specific details. As used in the description herein and throughout the claims that follow, the meaning of "a", "an", and "the" may include reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "low-dimensional" will be understood as the material is in a form of particle or dot like with zero-dimension. As used in the description herein and throughout the claims that follow, the meaning of "high" like "high production rate" or "high yield" will be understood as not particularly to only 80 to 100%, but also referred to a relatively high quantity compared to conventional methods under similar conditions or with utilizing same materials.

Figure 2:
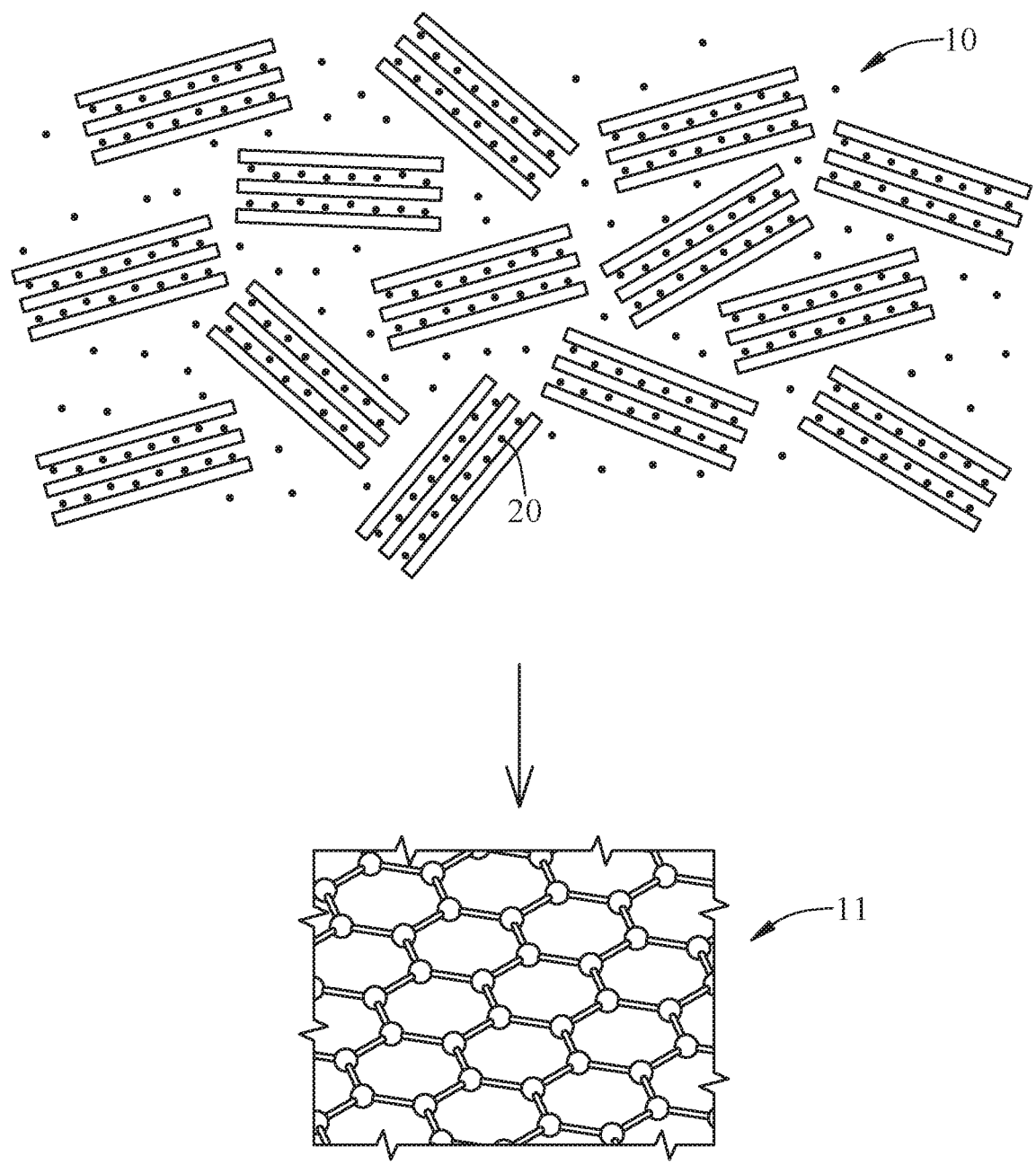
FIG. 2 is an illustration of layered material being exfoliated into the low dimensional nano-material in accordance with the present invention.
Figure 3A:
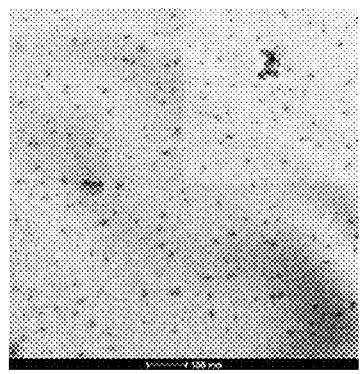
FIG. 3a~3f is a series of TEM figures of the low dimensional nano-materials in accordance with the present invention.
Figure 3B:
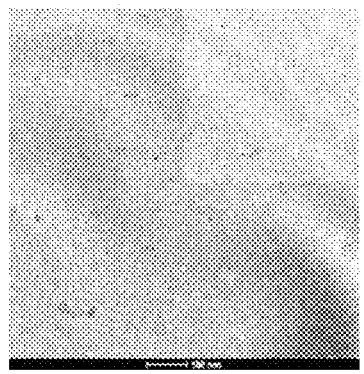
Figure 3C:
Figure 3D:
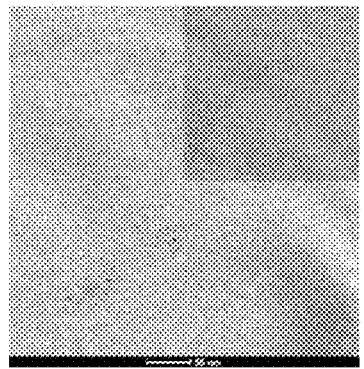
Figure 3E:
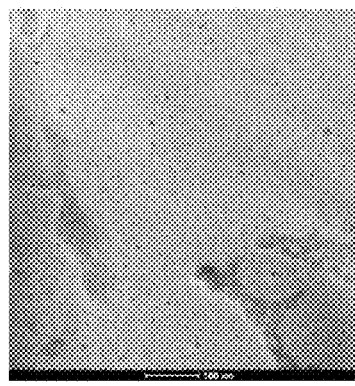
Figure 3F:
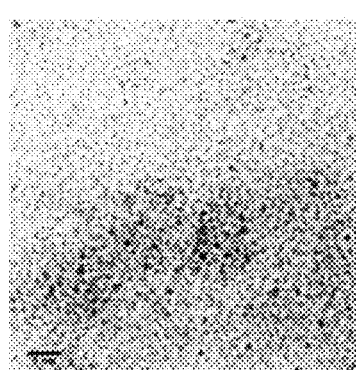

With reference to FIG. 1 to FIG. 2, a production method of low dimensional nano-material comprises:

Step 1: introducing a layered material 10;

Step 2: adding an intercalating agent 20 into the layered material 10; and

Step 3: exfoliating the layered material 10 into a low dimensional nano-material by ball-milling the layered material 10 and the intercalating agent 20.

The aforementioned layered material 10 has multiple layers and may be but not limited to graphite, graphene or molybdenum disulfide ($MoS_2$). The said intercalating agent 20 is able to reduce or eliminate an attraction or a binding force like Van Der Waals Force between layers of the layered material 10.

The intercalating agent 20 is preferred to be a powdered compound containing alkali metals, more preferred to be potassium carbonate ($K_2CO_3$), lithium carbonate ($Li_2CO_3$), potassium hydroxide (KOH), potassium phosphate ($K_3PO_4$), sodium carbonate ($Na_2CO_3$), sodium hydroxide (NaOH), lithium hydrate (LiOH), sodium bicarbonate ($NaHCO_3$), potassium nitrate ($KNO_3$), potassium bicarbonate ($KHCO_3$) or potassium sulphate ($K_2SO_4$). The intercalating agent 20 containing alkali metals is able to produce cationic ions with a larger ionic diameter in the ball-milling step. When the cationic ions with a larger size intercalated into the layered material 10, spaces between layers of the layered material 10 will become larger or wider which may effectively decrease the attraction or the bonding force within those layers. Hence, the layered material 10 will be exfoliated more easily and efficiently.

The above described low dimensional nano-material is referred to as a zero-dimensional material including quantum dots (QDs), graphene quantum dots (GQDs), carbon quantum dots (CQDs) or molybdenum disulfide quantum dots ($MoS_2QDs$).

With reference to chart 1 and chart 2 below, the present invention provides a first embodiment with several examples as follows. The layered material is graphite in the first embodiment. By using different intercalating agents and different rotational speed, process time and energy in the ball-milling process, the present invention is able to provide high quality GQDs with high quantum luminous efficiency and yields. The emitting wavelength of GQDs is at a range of 439 nm to 465 nm in the first embodiment of the present invention.

CHART 1

| Intercalating agent | Solvent | Intercalating agent: Graphite (g:g) | Rotational speed (rpm) | Process time of ball milling (hr) | Ball milling energy (GJ) |
|---|---|---|---|---|---|
| $K_2CO_3$ | Not exist | 2:1 | 1250 | 5 | 585.94 |
| $Li_2CO_3$ | Not exist | 2:1 | 1250 | 5 | 585.94 |
| KOH | Not exist | 2:1 | 600 | 4 | 51.84 |
| $K_3PO_4$ | Not exist | 2:1 | 1250 | 4 | 468.75 |
| $Na_2CO_3$ | Not exist | 2:1 | 500 | 4 | 30 |
| NaOH | Not exist | 2:1 | 500 | 4 | 30 |
| LiOH | Not exist | 2:1 | 750 | 2 | 50.63 |
| $NaHCO_3$ | Not exist | 2:1 | 1000 | 4 | 240 |
| $KNO_3$ | Not exist | 2:1 | 750 | 2 | 50.63 |
| $KHCO_3$ | Not exist | 2:1 | 750 | 2 | 50.63 |
| $K_2SO_4$ | Not exist | 2:1 | 750 | 2 | 50.63 |

CHART 2

| Intercalating agent | Yields of GQDs (%) | Quantum luminous efficiency (%) | Emitting wavelength (nm) |
|---|---|---|---|
| $K_2CO_3$ | 100 | 2.29 | 452 |
| $Li_2CO_3$ | 51.15 | 2.16 | 453 |
| KOH | 6.64 | 2.18 | 440 |
| $K_3PO_4$ | 6.37 | 1.30 | 441 |
| $Na_2CO_3$ | 5.85 | 1.24 | 442 |
| NaOH | 5.60 | 1.36 | 440 |
| LiOH | 4.15 | 1.10 | 442 |
| $NaHCO_3$ | 2.80 | 2.23 | 438 |
| $KNO_3$ | 2.79 | 1.06 | 439 |
| $KHCO_3$ | 1.82 | 1.86 | 439 |
| $K_2SO_4$ | 0.88 | 4.46 | 465 |

With reference to chart 3 and chart 4 below, the present invention provides a second embodiment with several examples as follows. The layered material is molybdenum disulfide ($MoS_2$) in the second embodiment. By using different intercalating agents and different rotational speed, process time and energy in the ball-milling process, the present invention is able to provide high quality $MoS_2QDs$ with high quantum luminous efficiency and yields. The emitting wavelength of $MoS_2QDs$ is at a range of 375 nm to 425 nm in the second embodiment of the present invention.

CHART 3

| Intercalating agent | Solvent | Intercalating agent:$MoS_2$ (g:g) | Rotational speed (rpm) | Process time of ball milling (hr) | Ball milling energy (GJ) |
|---|---|---|---|---|---|
| $K_2CO_3$ | Not exist | 2:1 | 1250 | 4 | 468.75 |
| $Li_2CO_3$ | Not exist | 2:1 | 1250 | 4 | 468.75 |
| KOH | Not exist | 2:1 | 1250 | 4 | 468.75 |
| $K_3PO_4$ | Not exist | 2:1 | 1250 | 4 | 468.75 |
| $Na_2CO_3$ | Not exist | 2:1 | 1250 | 4 | 468.75 |
| NaOH | Not exist | 2:1 | 1250 | 4 | 468.75 |
| $NaHCO_3$ | Not exist | 2:1 | 1250 | 4 | 468.75 |
| $KHCO_3$ | Not exist | 2:1 | 1250 | 4 | 468.75 |

CHART 4

| Intercalating agent | Yields of GQDs (%) | Quantum luminous efficiency (%) | Emitting wavelength (nm) |
|---|---|---|---|
| $K_2CO_3$ | 24.02 | 7.4 | 395 |
| $Li_2CO_3$ | 26.72 | 6.08 | 430 |
| KOH | 14.1 | 7.04 | 420 |
| $K_3PO_4$ | 4.3 | 6.21 | 425 |
| $Na_2CO_3$ | 35.96 | 7.32 | 420 |
| NaOH | 43.06 | 7.26 | 415 |
| $NaHCO_3$ | 4.02 | 6.25 | 395 |
| $KHCO_3$ | 2.04 | 7.08 | 375 |

With reference to chart 5 below and FIG. 3a~3f, the present invention is able to produce the low dimensional nano-material with a united size. Chart 5 illustrates the size of the low dimensional nano-material produced by different intercalating agents.

CHART 5

| Intercalating agent | Size (nm) |
|---|---|
| $KHCO_3$ | 4.72 ± 1.77 |
| $Li_2CO_3$ | 4.46 ± 1.27 |
| $K_2CO_3$ | 7.54 ± 2.78 |
| LiOH | 2.77 ± 1.33 |
| NaOH | 3.85 ± 1.11 |
| KOH | 2.99 ± 1.25 |

The above specification, examples, and data provide a complete description of the present disclosure and use of exemplary embodiments. Although various embodiments of the present disclosure have been described above with a certain degree of particularity, or with reference to one or more individual embodiments, those with ordinary skill in the art could make numerous alterations or modifications to the disclosed embodiments without departing from the spirit or scope of this disclosure.

What is claimed is:

1. A production method of low dimensional nano-material comprising steps of:
    introducing a layered material;
    adding a intercalating agent into the layered material; and
    exfoliating the layered material by ball-milling to form the low dimensional material;
    wherein:
    a rotational speed of ball-milling is at a range of 500 rpm to 1250 rpm;
    an energy of ball-milling is at a range of 15 GJ to 585.94 GJ, and a process time of ball-milling is at a range of 2 hours to 5 hours.

2. The production method of low dimensional nano-material as claimed in claim 1, wherein: the layered material contains graphite, graphene or molybdenum disulfide.

3. The production method of low dimensional nano-material as claimed in claim 1, wherein: the intercalating agent comprises potassium carbonate, lithium carbonate, potassium hydroxide, potassium phosphate, sodium carbonate, sodium hydroxide, lithium hydrate, sodium bicarbonate, potassium nitrate, potassium bicarbonate or potassium sulphate.

4. The production method of low dimensional nano-material as claimed in claim 2, wherein: the intercalating agent comprises potassium carbonate, lithium carbonate, potassium hydroxide, potassium phosphate, sodium carbonate, sodium hydroxide, lithium hydrate, sodium bicarbonate, potassium nitrate, potassium bicarbonate or potassium sulphate.

5. The production method of low dimensional nano-material as claimed in claim 1, wherein:
    a yield of the low dimensional nano-material is at a range of 0.88% to 100%; and
    a quantum luminous efficiency of the low dimensional nano-material is at a range of 1.06% to 7.4%.

6. The production method of low dimensional nano-material as claimed in claim 2, wherein:
    a yield of the low dimensional nano-material is at a range of 0.88% to 100%; and
    a quantum luminous efficiency of the low dimensional nano-material is at a range of 1.06% to 7.4%.

7. The production method of low dimensional nano-material as claimed in claim 3, wherein:
    a yield of the low dimensional nano-material is at a range of 0.88% to 100%; and
    a quantum luminous efficiency of the low dimensional nano-material is at a range of 1.06% to 7.4%.

8. The production method of low dimensional nano-material as claimed in claim 4, wherein:
    a yield of the low dimensional nano-material is at a range of 0.88% to 100%; and
    a quantum luminous efficiency of the low dimensional nano-material is at a range of 1.06% to 7.4%.

* * * * *